United States Patent
Yoshioka

(10) Patent No.: US 8,537,252 B2
(45) Date of Patent: Sep. 17, 2013

(54) SOLID-STATE IMAGING DEVICE AND CAMERA SYSTEM WHICH PERFORMS CLAMP PROCESSING

(75) Inventor: Daisuke Yoshioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 12/801,672

(22) Filed: Jun. 21, 2010

(65) Prior Publication Data

US 2011/0025871 A1 Feb. 3, 2011

(30) Foreign Application Priority Data

Jul. 30, 2009 (JP) .................................. 2009-177866

(51) Int. Cl.
*H04N 9/64* (2006.01)

(52) U.S. Cl.
USPC .......................................................... 348/243

(58) Field of Classification Search
None
See application file for complete search history.

(56) References Cited

U.S. PATENT DOCUMENTS

| | | | | |
|---|---|---|---|---|
| 6,157,407 A | * | 12/2000 | Kobayashi | 348/241 |
| 6,982,757 B2 | * | 1/2006 | Tariki | 348/243 |
| 7,365,790 B2 | * | 4/2008 | Shinohara | 348/345 |
| 2002/0033891 A1 | * | 3/2002 | Ying et al. | 348/241 |
| 2003/0202111 A1 | * | 10/2003 | Park | 348/243 |
| 2004/0207734 A1 | * | 10/2004 | Horiuchi | 348/229.1 |
| 2008/0211946 A1 | * | 9/2008 | Uchida | 348/294 |

FOREIGN PATENT DOCUMENTS

JP 2004-080168 3/2004

* cited by examiner

*Primary Examiner* — Albert Cutler
(74) *Attorney, Agent, or Firm* — Rader, Fishman & Grauer PLLC

(57) ABSTRACT

A solid-state imaging device includes: a pixel unit in which pixels that perform photoelectric conversion are arranged in an optical black region and a valid pixel region; a readout processing unit that applies, to a readout signal of the pixel unit, readout processing corresponding to a reference signal subjected to clamp processing; and a clamp processing unit that clamps, referring to a readout signal level in the optical black region, a reference signal in the valid pixel region with an acquired clamp value, which is a value with which the signal level is reduced to zero. The clamp processing unit acquires, when information concerning readout is changed, a clamp value predicted from the clamp value before the change and a ratio of charge accumulation times before and after the change, and the readout processing unit performs first signal readout processing after the change with a reference signal clamped by the predicted clamp value.

7 Claims, 10 Drawing Sheets

CONFIGURATION OF CURRENT CONTROLLED DAC

SOLID-STATE IMAGING DEVICE AND CAMERA SYSTEM WHICH PERFORMS CLAMP PROCESSING

BACKGROUND OF THE INVENTION

1. Field of the Invention

The present invention relates to a solid-state imaging device having a function of clamping, referring to a readout signal level in an optical black region, a signal in a valid pixel region with a value with which the signal level is reduced to zero.

2. Description of the Related Art

As a technique for correcting deterioration in image quality due to dark current, as disclosed in, for example, JP-A-2004-80168, there is a technique for clamping, referring to a readout signal level in an optical black region, a signal in a valid pixel region with a value with which the signal level is reduced to zero.

As one of systems for realizing such a technique, there is known a feedback control system for calculating, from a readout signal level in an optical black region of the present frame, a clamp value with which the signal level is reduced to zero and setting the clamp value as a clamp value in reading out the next frame.

In the feedback control system, in order to suppress oscillation of a clamp control amount, feedback is performed at a feedback ratio smaller than one. Therefore, time for a period of several frames is necessary until convergence of the clamp value.

There is also known a driving system for combining plural frames having different accumulation times to expand a dynamic range.

In the driving system, a clamp value is stored for each of the frames having the different accumulation times to perform feedback control for a clamp amount.

SUMMARY OF THE INVENTION

However, in the feedback control system, when setting of the accumulation times is changed from a clamp convergence state, in the first frame, readout is performed at a clamp value corresponding to the accumulation time before the setting change.

Therefore, a state once deviates from clamp convergence and feedback control for convergence is started from the state. Therefore, there is a disadvantage that time for a period of several frames is necessary until reconvergence.

In the driving system for expanding a dynamic range, when a mode of the driving system is transitioned from single frame driving to plural frame driving, a frame started anew converges from a clamp initial value set in advance.

As a result, the feedback control for convergence is started from this point. Therefore, there is a disadvantage that time for a period of several frames is necessary until convergence of a clamp value.

Therefore, it is desirable to provide a solid-state imaging device and a camera system that can improve clamp convergence speed.

According to an embodiment of the present invention, there is provided a solid-state imaging device including: a pixel unit in which pixels that perform photoelectric conversion are arranged in an optical black region and a valid pixel region; a readout processing unit that applies, to a readout signal of the pixel unit, readout processing corresponding to a reference signal subjected to clamp processing; and a clamp processing unit that clamps, referring to a readout signal level in the optical black region, a reference signal in the valid pixel region with an acquired clamp value, which is a value with which the signal level is reduced to zero, wherein the clamp processing unit acquires, when information concerning readout is changed, a clamp value predicted from the clamp value before the change and a ratio of charge accumulation times before and after the change, and the readout processing unit performs first signal readout processing after the change with a reference signal clamped by the predicted clamp value.

According to another embodiment of the present invention, there is provided a camera system including: a solid-state imaging device; an optical system that focuses a subject image on the solid-state imaging device; and a signal processing circuit that processes an output image signal of the solid-state imaging device, wherein the solid-state imaging device includes: a pixel unit in which pixels including photoelectric conversion elements are arranged in an optical black region and a valid pixel region; a readout processing unit that applies, to a readout signal of the pixel unit, readout processing corresponding to a reference signal subjected to clamp processing; and a clamp processing unit that clamps, referring to a readout signal level in the optical black region, a reference signal in the valid pixel region with an acquired clamp value, which is a value with which the signal level is reduced to zero, and, when information concerning readout is changed, the clamp processing unit acquires a clamp value predicted from the clamp value before the change and a ratio of charge accumulation times before and after the change, and the readout processing unit performs first signal readout processing after the change with a reference signal clamped by the predicted clamp value.

According to the embodiments of the present invention, it is possible to improve clamp convergence speed.

DESCRIPTION OF THE PREFERRED EMBODIMENTS

An embodiment of the present invention is explained below with reference to the drawings. The embodiment is explained in the following order.

1. Overall configuration example of solid-state imaging device
2. Configuration example of column ADC
3. First configuration example of clamp-value acquiring unit
4. Second configuration example of clamp-value acquiring unit
5. Third configuration example of clamp-value acquiring unit
6. Configuration example of camera system FIG. 1 is a block diagram of a configuration example of a solid-state imaging device (a CMOS image sensor) mounted with a column-parallel ADC according to an embodiment of the present invention.

Figure 1:
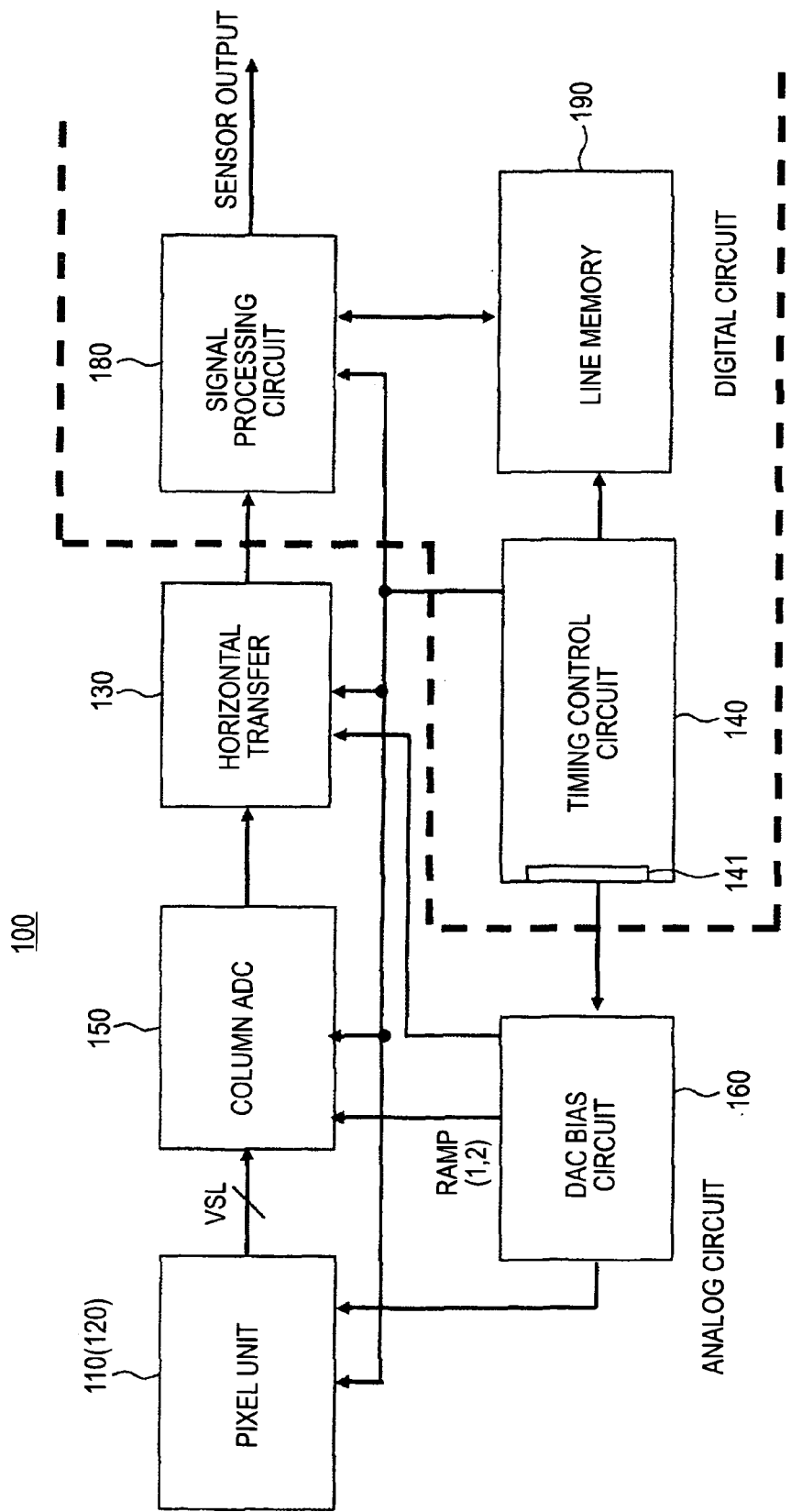
FIG. 1 is a block diagram of a configuration example of a solid-state imaging device (a CMOS image sensor) mounted with a column parallel ADC according to an embodiment of the present invention.
Figure 2:
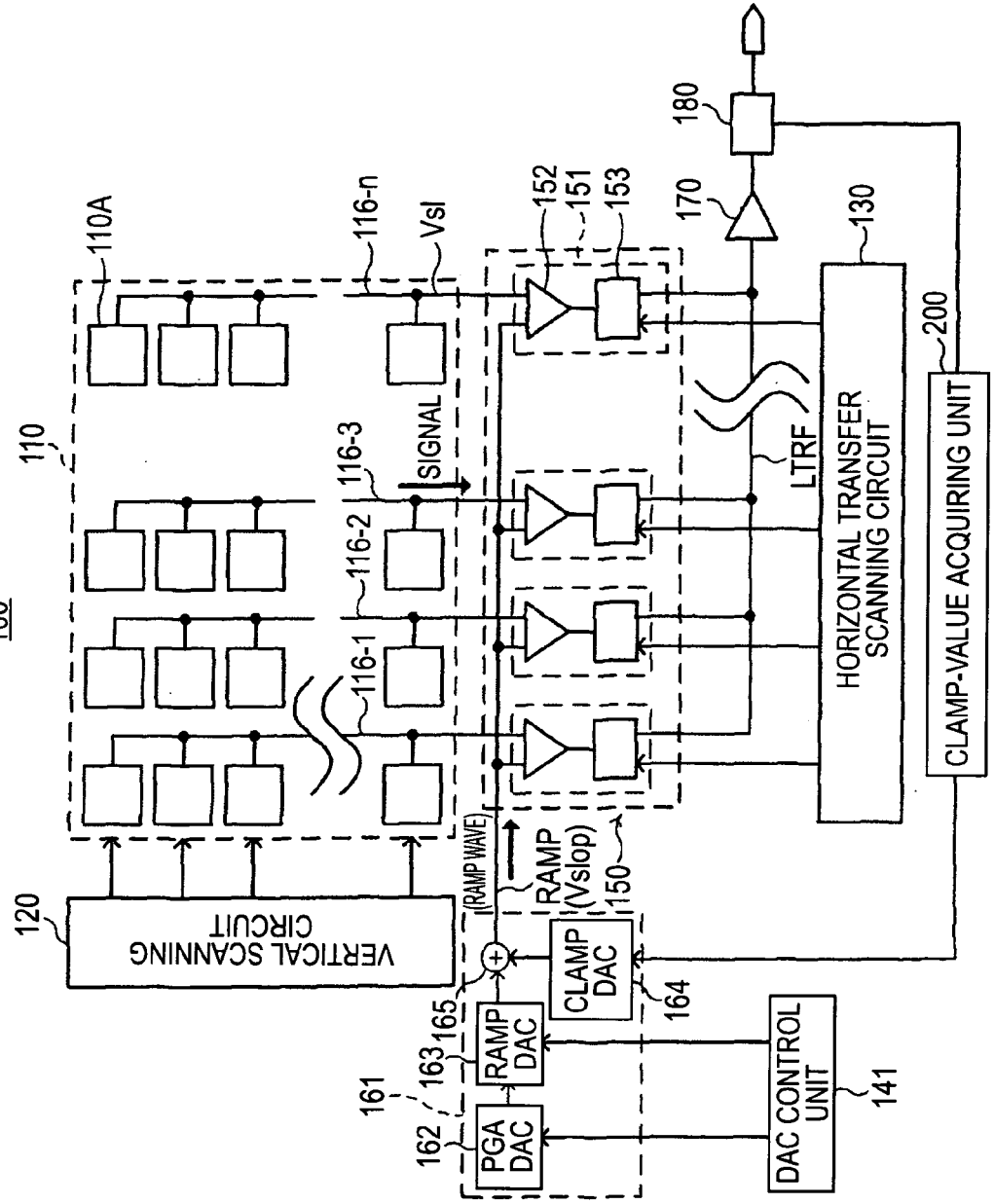
FIG. 2 is a first block diagram of a more specific ADC group in the solid-state imaging device (the CMOS image sensor) mounted with the column parallel ADC shown in FIG. 1.

FIG. 2 is a first block diagram of a more specific ADC group in the solid-state imaging device (the CMOS image sensor) mounted with the column parallel ADC shown in FIG. 1.

Figure 3:
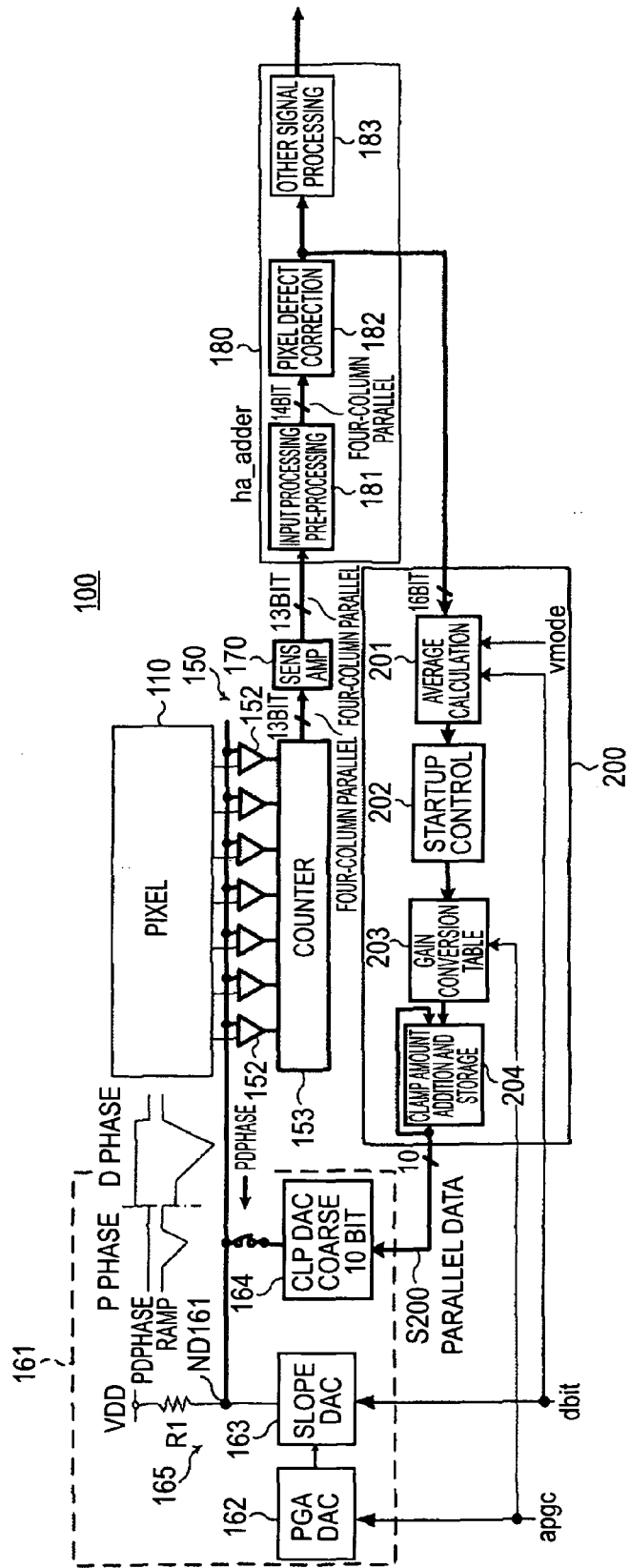
FIG. 3 is a second block diagram of the more specific ADC group in the solid-state imaging device (the CMOS image sensor) mounted with the column parallel ADC shown in FIG. 1.

FIG. 3 is a second block diagram of the more specific ADC group in the solid-state imaging device (the CMOS image sensor) mounted with the column parallel ADC shown in FIG. 1.

<1. Overall Configuration Example of Solid-State Imaging Device>

A solid-state imaging device 100 includes, as shown in FIGS. 1 and 2, a pixel unit 110 as an imaging unit, a vertical scanning circuit 120, a horizontal transfer scanning circuit 130, and a timing control circuit 140.

The solid-state imaging device 100 includes a column processing circuit group 150 that is an ADC group as a pixel signal readout circuit and a DAC and bias circuit 160 including a DAC (digital-analog converter) 161.

Further, the solid-state imaging device 100 includes an amplifier circuit (S/A) 170, a signal processing circuit 180, and a line memory 190.

The column processing circuit group (the ADC group) 150 and the DAC and bias circuit 160 configure a readout processing unit.

Among these components, the pixel unit 110, the vertical scanning circuit 120, the horizontal transfer scanning circuit 130, the column processing circuit group (the ADC group) 150, the DAC and bias circuit 160, and the amplifier circuit (S/A) 170 include analog circuits.

The timing control circuit 140, the signal processing circuit 180, and the line memory 190 include digital circuits.

The solid-state imaging device 100 according to this embodiment has a function of clamping, referring to a readout signal level in an optical black region, a signal of a valid pixel region with a value with which the signal level is reduced to zero.

To correspond to this function, the solid-state imaging device 100 according to this embodiment includes a clamp-value acquiring unit 200 that acquires a clamp value of a reference signal RAMP from an output of the signal processing circuit 180.

The clamp-value acquiring unit 200 and the clamp DAC 164 configure a clamp processing unit.

The clamp-value acquiring unit 200 performs, when a set value of charge accumulation time is changed, first signal readout after the setting change with a clamp value predicted from a clamp value before the change and a ratio of charge accumulation values before after the setting change to improve clamp convergence speed.

The solid-state imaging device 100 according to this embodiment has a function of, in a driving system for combining plural frames having different accumulation times to expand a dynamic range, storing a clamp value for each of the frames having the different accumulation times and performing black level adjustment independently for the frame.

To correspond to this function, the clamp-value acquiring unit 200 uses, when a mode of the solid-state imaging device 100 is transitioned from single frame driving to plural frame driving, a clamp value of a frame operating before the mode transition as an initial clamp value of a frame started anew. Consequently, the solid-state imaging device 100 improves clamp convergence speed of the frame started anew.

In using the clamp value of the frame operating before the mode transition as the initial clamp value of the frame started anew, the clamp-value acquiring unit 200 uses the clamp value taking into account a coefficient corresponding to a ratio of accumulation times of the respective frames to further improve the clamp convergence speed.

Information concerning the readout includes information concerning set values of accumulation times and frame modes.

A specific configuration and a specific function for improving the clamp convergence speed are explained in detail later.

In the pixel unit 110, plural unit pixels 110A including photodiodes (photoelectric conversion elements) and intra-pixel amplifiers are arrayed in a two-dimensional shape (a matrix shape) of m rows and n columns.

[Configuration Example of Unit Pixel]

Figure 4:
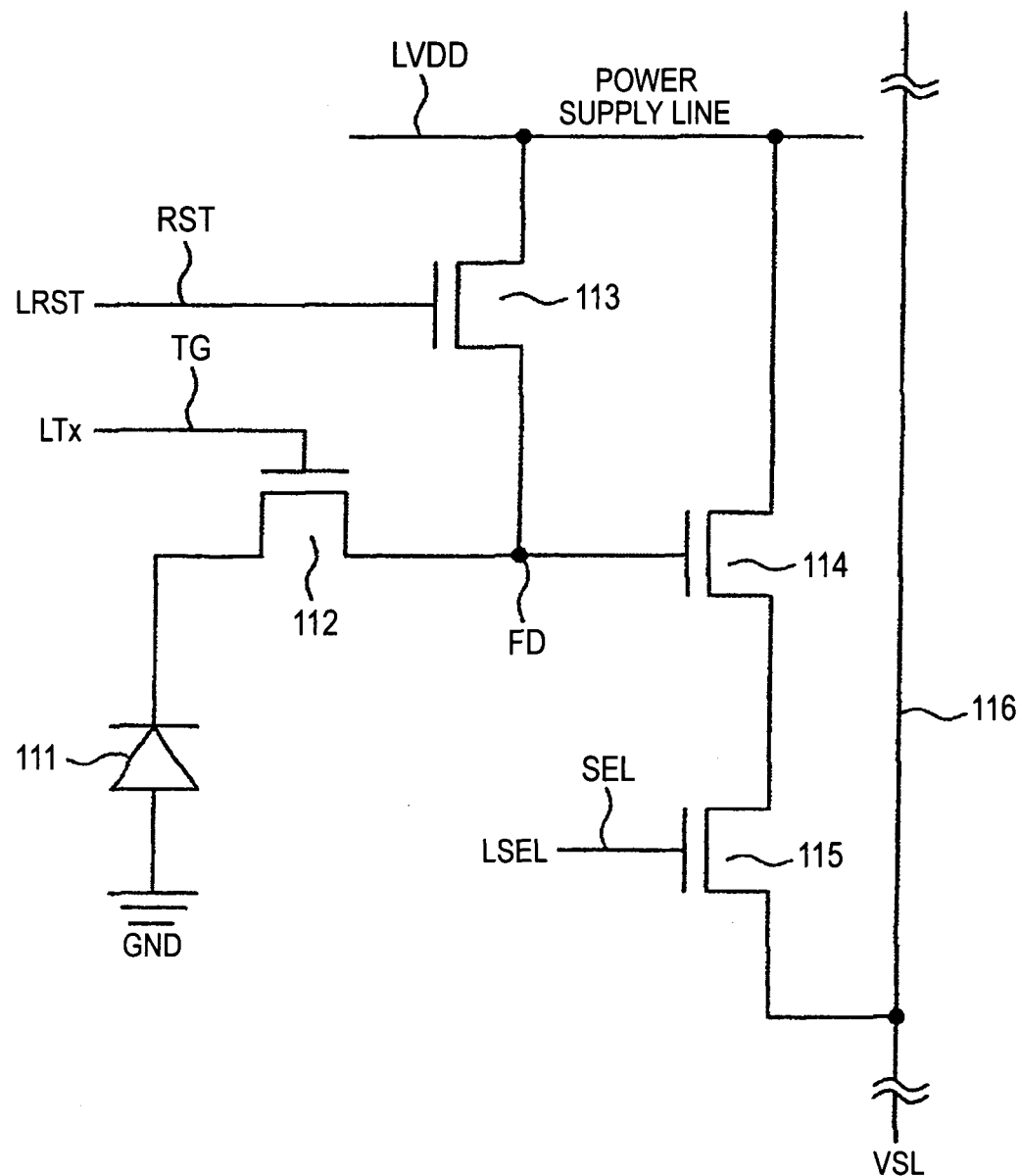
FIG. 4 is a diagram of an example of a pixel of a CMOS image sensor including four transistors according to the embodiment.

FIG. 4 is a diagram of an example of a pixel of a CMOS image sensor including four transistors according to this embodiment.

A unit pixel 110A includes, for example, a photodiode 111 as a photoelectric conversion element.

The unit pixel 110A includes, as active elements, four transistors, i.e., a transfer transistor 112 as a transfer element, a reset transistor 113 as a reset element, an amplifier transistor 114, and a selection transistor 115 with respect to one photodiode 111.

The photodiode 111 photoelectrically converts incident light into charges (electrons) of an amount corresponding to an amount of the incident light.

The transfer transistor 112 is connected between the photodiode 111 and a floating diffusion FD as an output node.

When a driving signal TG is given to a gate (a transfer gate) of the transfer transistor 112 through a transfer control line LTx, the transfer transistor 112 transfers the electrons photoelectrically converted by the photodiode 111 to the floating diffusion FD.

The reset transistor 113 is connected between a power supply line LVDD and the floating diffusion FD.

When a reset signal RST is given to a gate of the reset transistor 113 through a reset control line LRST, the reset transistor 113 resets the potential of the floating diffusion FD to the potential of the power supply line LVDD.

A gate of the amplifier transistor 114 is connected to the floating diffusion FD. The amplifier transistor 114 is connected to a vertical signal line 116 via the selection transistor 115 and configures a source follower together with a constant current source on the outside of the pixel unit.

When a control signal (an address signal or a select signal) SEL is given to a gate of the selection transistor 115 through a selection control line LSEL, the selection transistor 115 is turned on.

When the selection transistor 115 is turned on, the amplifier transistor 114 amplifies the potential of the floating diffusion FD and outputs voltage corresponding to the potential to the vertical signal line 116. Voltages output from the pixels are output to the column processing circuit group 150 as a pixel signal readout circuit through the vertical signal line 116.

These kinds of operation are simultaneously performed in parallel for the pixels in one row because, for example, the gates of the transfer transistor 112, the reset transistor 113, and the selection transistor 115 are connected in a unit of rows.

The reset control line LRST, the transfer control line LTx, and the selection control line LSEL wired in the pixel unit 110 are wired as a set in a unit of rows of the pixel array.

The reset control line LRST, the transfer control line LTx, and the selection control line LSEL are driven by the vertical scanning circuit 120 as a pixel driving unit.

In the solid-state imaging device 100, the timing control circuit 140 that generates an internal clock, the vertical scanning circuit 120 that controls a row address and row scanning, and the horizontal transfer scanning circuit 130 that controls a column address and column scanning are arranged as control circuits for sequentially reading out signals of the pixel unit 110.

The timing control circuit 140 generates timing signals necessary for signal processing of the pixel unit 110, the vertical scanning circuit 120, the horizontal transfer scanning circuit 130, the column processing circuit group 150, the DAC and bias circuit 160, the signal processing circuit 180, and the line memory 190.

The timing control circuit 140 includes a DAC control unit 141 that controls generation of a reference signal RAMP (Vslop) of the DAC 161 in the DAC and bias circuit 160.

The DAC control unit 141 performs, for each of rows for which the AD conversion of column processing circuits (ADCs) 151 of the column processing circuit group 150 is performed, control to adjust offset of the reference signal RAMP.

The DAC control unit 141 can perform, during correlated double sampling (CDS) in the column processing circuit group 150, control to perform offset adjustment for the reference signal RAMP of each of primary sampling and secondary sampling.

The pixel unit 110 photoelectrically converts, for each of pixel rows, a video or a screen image through photon accumulation and discharge using a line shutter and outputs an analog signal VSL to the column processing circuits 151 of the column processing circuit group 150.

In this embodiment, a readout signal from the pixel unit includes a black level signal from an optical black (OPB) region.

Figure 5:
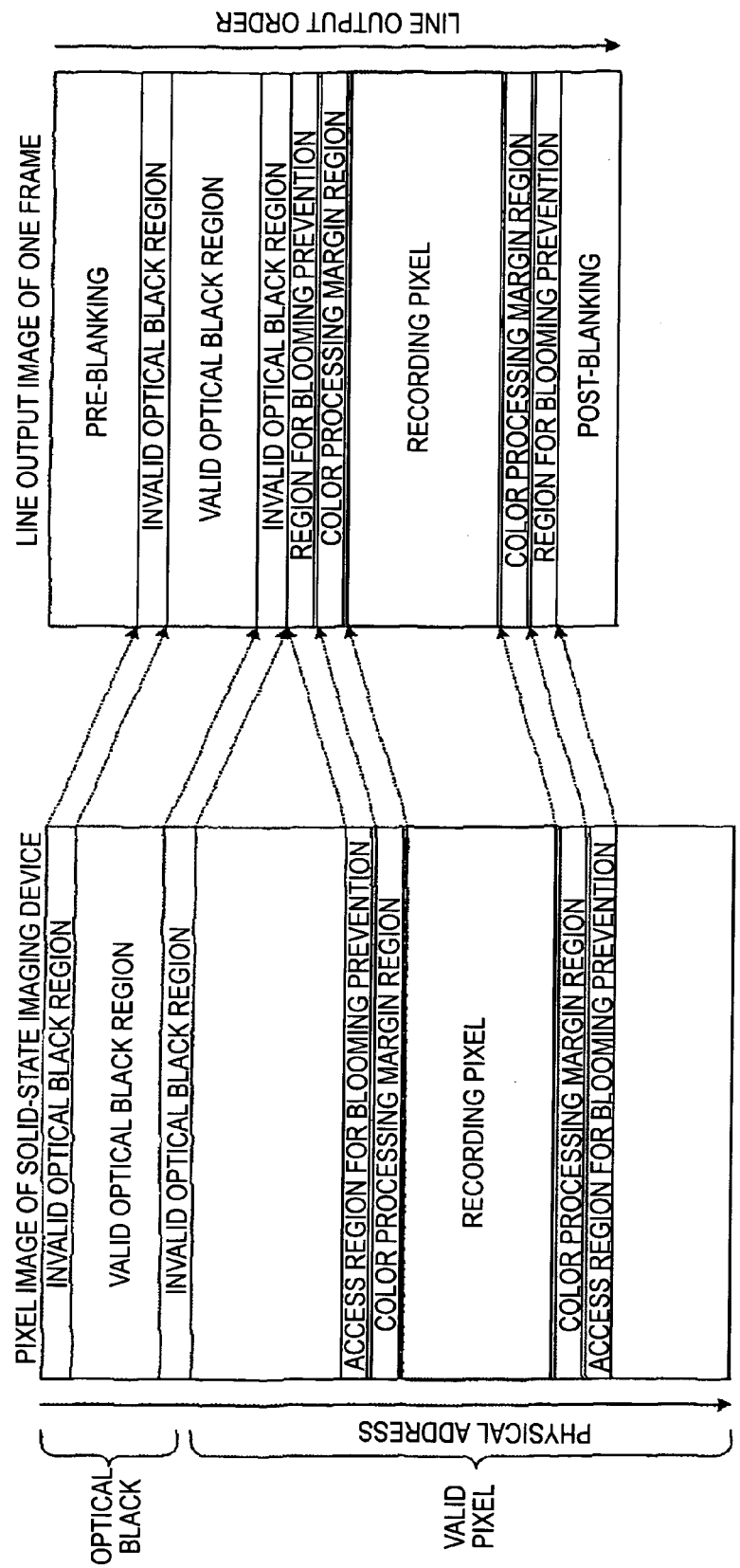
FIG. 5 is a diagram of an example of an output row of a row-access solid-state imaging device.

Output rows of a row-access solid-state imaging device includes, as shown in FIG. 5, a recording pixel, a color processing margin, validity unquestioned, optical black, optical black unquestioned, and blanking.

The validity unquestioned, the optical black unquestioned, and the blanking are unnecessary as data.

A blanking output is present for, for example, a communication period between the outside and the solid-state imaging device, waiting time for stabilization of an internal circuit after a setting change for a gain value and the like of the solid-state imaging device, and timing adjustment with the outside.

In a blanking period, readout access or reset access to a pixel array unit is not performed. A readout row accesses a specific address not affected by readout.

In the solid-state imaging device, the number of output rows of the optical black is fixed by the pixel array unit.

The number of optical blacks is different according to an application. For example, a large number of optical blacks are necessary when a still image is photographed. However, the number of optical blacks can be reduced when a moving image is photographed.

The ADC group 150 subjects, in each of ADC blocks (column units), an analog output from the pixel unit 110 to APGA adaptable integrated ADC and digital CDS using the reference signal (the ramp signal) RAMP from the DAC 161 and outputs a digital signal of several bits.

<2. Configuration Example of Column ADC>

In the column processing circuit group 150 according to this embodiment, the column processing circuits (ADCs) 151 as ADC blocks are arrayed in plural columns.

Specifically, the column processing circuit group 150 has a k-bit digital signal converting function. The column processing circuit group 150 includes column-parallel ADC blocks arranged in respective vertical signal lines (column lines) 116-1 to 116-n.

The ADCs 151 include comparators 152 that compare the reference signal RAMP (Vslop) as a ramp waveform obtained by stepwise changing a reference signal generated by the DAC 161 and the analog signals Vsl obtained, for the respective row lines, from the pixels through the vertical signal lines.

The ADCs 151 further include counter latches 153 that count comparison times and store count results.

Outputs of the counter latches 153 are connected to a horizontal transfer line LTRF having, for example, k-bit width.

The k amplifier circuits 170 corresponding to the horizontal transfer line LTRF and the signal processing circuit 180 are arranged.

In the ADC group 150, the comparators 152 arranged in the respective columns compare the analog signal potentials Vsl read out to the vertical signal lines 116 with the reference signal Vslop (the ramp signal RAMP as a slope waveform that changes in a linear shape having a certain tilt).

At this point, the counter latches 153 arranged in the respective columns in the same manner as the comparators 152 are operating.

When the reference signal RAMP (the potential Vslop) as a ramp waveform and counter values change while corresponding to each other in a one-to-one relation, the ADCs 151 convert the potentials (the analog signals) Vsl of the vertical signal lines 116 into digital signals.

The ADCs 151 convert a change in the voltage of the reference signal RAMP (the potential Vslop) into a change in time and convert the time into a digital value by counting the time at a certain period (clock).

When the analog signals Vsl and the reference signal RAMP (Vslop) cross, outputs of the comparators 152 are inverted, input clocks of the counter latches 153 are stopped or clocks stopped to be input are input to the counter latches 153 to complete the AD conversion.

After the AD conversion period explained above ends, data stored in the counter latches 153 is transferred to the horizontal transfer line LTRF by the horizontal transfer scanning circuit 130 and input to the signal processing circuit 180 through the amplifiers 170. A two-dimensional image is generated by predetermined signal processing.

The horizontal transfer scanning circuit 130 performs several-channel simultaneous parallel transfer to secure transfer speed.

The timing control circuit 140 generates timing necessary for signal processing in the blocks of the pixel unit 110, the column processing circuit group 150, and the like.

The signal processing circuit 180 at a post stage performs correction of a vertical line defect or a point detect from signals stored in the line memory 190 or clamp processing for the signals and performs digital signal processing such as parallel-serial conversion, compression, encoding, addition, averaging, and intermittent operation.

To correspond to such functions, the signal processing circuit 180 includes, as shown in FIG. 3, an input-processing pre-processing unit 181, a pixel-defect correcting unit 182, and a signal processing unit 183.

Data subjected to pixel defect correction by the pixel-defect correcting unit 182 is supplied to the signal processing unit 183 and the clamp-value acquiring unit 200.

Digital signals transmitted for the respective pixel rows are stored in the line memory 190.

In the solid-state imaging device 100 according to this embodiment, a digital output of the signal processing circuit 180 is transmitted as an input to an ISP or a baseband LSI.

As a method used in pixel signal readout of the CMOS image sensor, there is a method of temporarily sampling, via a MOS switch arranged near photoelectric conversion elements such as photodiodes, signal charges as optical signals generated by the photoelectric conversion elements in a capacitor ahead of the MOS switch and reading out the signal charges.

In a sampling circuit, noise having inverse correlation is usually superimposed on a sampling capacitance value. In the pixels, when the signal charges are transferred to a sampling capacitor, the signal charges are completely transferred by using a potential gradient. Therefore, noise does not occur in this sampling process. However, noise is superimposed when a voltage level of the capacitor before the sampling process is reset to a certain reference value.

As a method of removing the noise, the correlated double sampling (CDS) is adopted.

This is a method of once reading out and storing a state (a reset level) immediately before the signal charges are sampled, subsequently reading out a signal level after the sampling, and subtracting the reset level from the signal level to remove the noise.

The DAC 161 generates, under the control by the DAC control unit 141, a reference signal (a ramp signal) as a slope waveform that changes in a linear shape having a certain tilt and supplies the reference signal RAMP to the column processing circuit group 150.

The DAC 161 as a reference-signal generating unit includes, as shown in FIGS. 2 and 3, a PGA DAC 162, a ramp DAC (a slope DAC) 163, a clamp DAC 164, and an adding unit 165.

Figure 6:
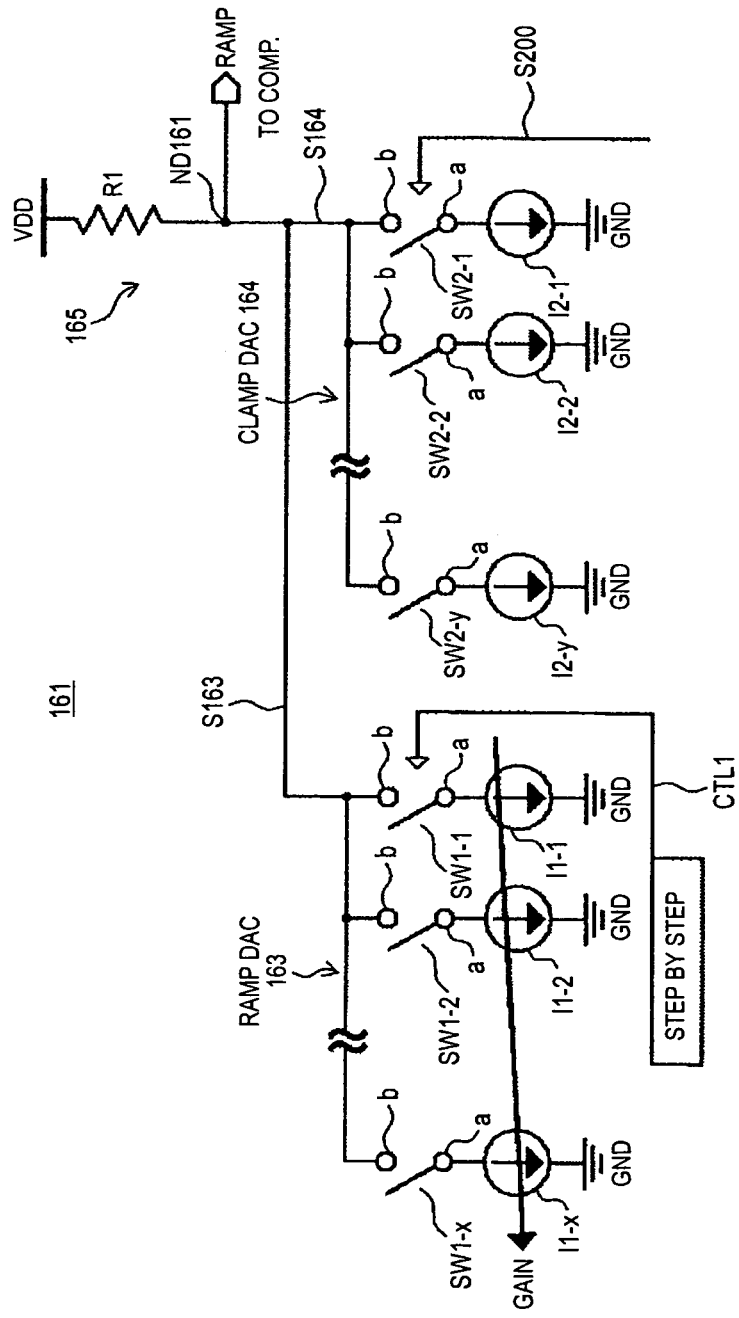
FIG. 6 is a diagram of a basic configuration example of a current controlled DAC according to the embodiment.

FIG. 6 is a diagram of a basic configuration example of the current-controlled DAC according to this embodiment.

The current-controlled DAC 161 is configured as a power-supply reference type DAC having a power supply VDD as a reference. The current-controlled DAC 161 can also be configured as a ground reference type DAC having a ground GND as a reference.

Specifically, one end of a reference register R1 is connected to the power supply VDD and an output of the ramp DAC 163 and an output of the clamp DAC 164 are connected to the other end of the reference register R1. A clamp output node ND161 is formed by a connection point of the outputs.

An adding unit 165 is formed by the reference register R1 and the output node ND161.

The current-controlled DAC 161 can be configured as the ground reference type DAC having the ground GND as a reference instead of being configured as the power-supply reference type DAC having the power supply VDD as a reference.

The clamp DAC 163 includes x current sources I1-1 to I1-$x$ and switches SW1-1 to SW1-$x$.

The current sources I1-1 to I1-$x$ connected to the ground GND are respectively connected to terminals "a" of the switches SW1-1 to SW1-$x$.

Terminals "b" of the switches SW1-1 to SW1-$x$ are connected in common to the output node ND161.

The switches SW1-1 to SW1-$x$ are selectively turned on and off according to a control signal CTL1 generated by the DAC control unit 141.

The clamp DAC 164 includes y current sources I2-1 to I2-$y$ and switches SW2-1 to SW2-$y$.

The current sources I2-1 to I2-$y$ connected to the ground GND are respectively connected to terminals "a" of the switches SW2-1 to SW2-$y$.

The terminals "b" of the switches SW2-1 to SW2-$y$ are connected in common to the output node ND161.

The switches SW2-1 to SW2-$y$ are selectively turned on and off according to a control signal S200 generated by the clamp-value acquiring unit 200.

In the DAC 161, as shown in FIG. 6, the reference signal RAMP (the ramp wave) in the integrated ADC is generated by adding up an output signal S164 of the clamp DAC 164 for DC level control and an output signal S163 of the ramp DAC 163.

[Configuration and Functions of Clamp-Value Acquiring Unit 200]

The clamp-value acquiring unit 200 receives the input of data after pixel defect correction, calculates an average in an intra-VOPB detection region from levels of OPB (optical blacks), and determines an analog clamp amount. The determined analog clamp amount is reflected on readout of the next frame.

Whereas the input data is data applied with analog gain, an analog clamp value is fed back before the analog gain.

Therefore, in order to determine the analog clamp amount from the calculated average, the clamp-value acquiring unit 200 inversely converts the analog gain applied to the average calculation data.

When plural frame operation is performed during a wide dynamic range, the clamp-value acquiring unit 200 stores analog clamp amounts in the frames and performs feedback.

The clamp-value acquiring unit 200 has a function of copying, when the plural frame operation is not performed, an analog clamp value of an operating frame to a clamp value of a non-operating frame. It is also possible to set an analog clamp value not to be copied.

The clamp-value acquiring unit 200 also has a function of feeding back a clamp amount of a frame usually in use as a clamp amount of all the frames.

To correspond to these functions, the clamp-value acquiring unit 200 shown in FIG. 3 basically includes an average calculating unit 201, a startup control unit 202, a gain conversion table 203, and a clamp-amount adding and storing unit 204.

The clamp-value acquiring unit 200 outputs the control signal S200 from the clamp-amount adding and storing unit 204 to the clamp DAC 164.

Characteristically, first, the clamp-value acquiring unit 200 performs, when a set value of charge accumulation time is changed, first signal readout after the setting change with a clamp value predicted from a clamp value before the setting change and a ratio of accumulation times before and after the setting change to improve clamp convergence speed.

Second, when a mode of the solid-state imaging device 100 is transitioned from single frame driving to plural frame driving, the clamp-value acquiring unit 200 uses a clamp value of a frame operating before the mode transition as an initial value of a frame started anew. Consequently, the clamp-value acquiring unit 200 improves clamp convergence speed of the frame started anew.

Third, in using the clamp value of the frame operating before the mode transition as the initial clamp value of the frame started anew, the clamp-value acquiring unit 200 uses the clamp value taking into account a coefficient corresponding to a ratio of accumulation times of the frames to further improve the clamp convergence speed.

A specific configuration example of a characteristic section of the clamp-value acquiring unit 200 according to this embodiment is explained below.

<3. First Configuration Example of Clamp-Value Acquiring Unit>

Figure 7:
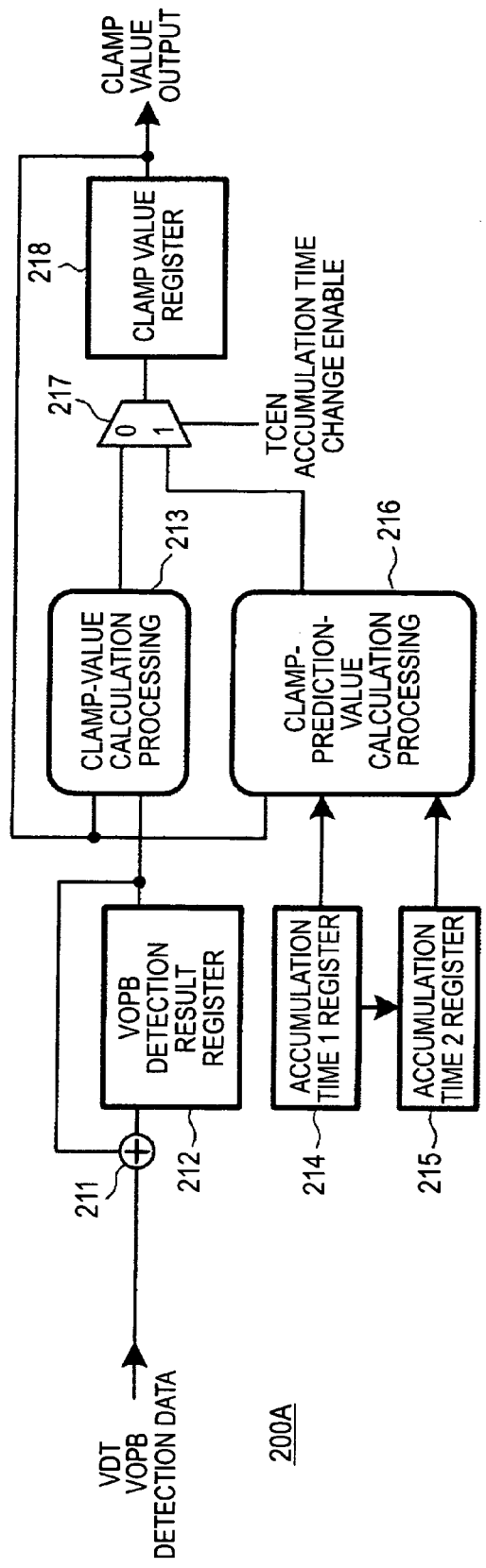
FIG. 7 is a diagram of a first configuration example of a clamp-value acquiring unit according to the embodiment.

FIG. 7 is a diagram of a first configuration example of the clamp-value acquiring unit according to this embodiment.

A clamp-value acquiring unit 200A shown in FIG. 7 includes an adder 211, a VOPB detection result register 212, a clamp-value calculation processing unit 213, a first accumulation time register 214, a second accumulation time register 215, and a clamp-prediction-value calculation processing unit 216.

The clamp-value acquiring unit 200A includes a selector 217 and a clamp value register 218.

The adder 211 adds up optical black region readout data (VOPB detection data) VDT input thereto and VOPB detection data stored in the VOPB detection result register 212 and outputs integrated VOPB detection data VDT to the VOPB detection result register 212.

The VOPB detection result register 212 stores the integrated VOPB detection data VDT and supplies the stored data to the clamp-value calculation processing unit 213.

The clamp-value calculation processing unit 213 performs clamp value calculation processing on the basis of the stored data of the VOPB detection result register 212 and stored data of the clamp value register 218 to be fed back.

The clamp-value calculation processing unit 213 calculates a new clamp value with which VOPB detection data is reduced to zero.

The clamp-value calculation processing unit 213 calculates an average in the intra-VOPB detection region from levels of OPBs and determines an analog clamp amount.

In order to determine the analog clamp amount from the calculated average, the analog-value calculation processing unit 213 inversely converts analog gain applied to average calculation data.

The first accumulation time register 214 is a register that stores present accumulation time setting.

The second accumulation time register 215 is a register that stores the immediately preceding accumulation time setting.

The clamp-prediction-value calculation processing unit 216 calculates a clamp prediction value from the accumulation times stored in the first accumulation time register 214 and the second accumulation time register 215 and the stored data of the clamp value register 218.

The clamp-prediction-value calculation processing unit 216 calculates the clamp prediction value according to, for example, a clamp amount prediction formula described below.

A clamp amount CLP is given by the following formula.

$$CLP(\text{clamp amount})=aX+b$$

(X: accumulation time, a: accumulation time coefficient, b: offset component)

A converging clamp amount Y1 in first accumulation time X1 is given by the following formula.

$$Y1=aX1+b$$

A converging clamp amount Y2 in second accumulation time X2 is given by the following formula.

$$Y2=aX2+b$$

In a state in which a clamp value converges in the first storage time X1 (a clamp amount Y1), when the accumulation time is changed to X2, a clamp amount prediction formula for calculating Y2 from X1, X2, and Y1 is as follows:

$$Y2=Y1+a(X2-X1)$$

The selector 217 inputs, according to an accumulation time change enable signal TCEN, a clamp value S213 calculated by the clamp-value calculation processing unit 213 or a clamp prediction value S216 calculated by the clamp-prediction-value calculation processing unit 216 to the clamp value register 218.

When the accumulation time change enable signal TCEN is inactive, for example, "0 (a low level)", the selector 217 selects the clamp value S213 calculated by the clamp-value-calculation processing unit 213 and inputs the clamp value S213 to the clamp value register 218.

When the accumulation time change enable signal TCEN is active, for example, "1 (a high level)", the selector 217 selects the clamp value prediction value S216 calculated by the clamp-prediction-value calculation processing unit 216 and inputs the clamp value prediction value S216 to the clamp value register 218.

The accumulation time change enable signal TCEN is activated when readout of a first frame is started after an accumulation time setting change.

The operation of a circuit shown in FIG. 7 is explained below.

The first accumulation time register 214 is a register that stores the present accumulation time setting. The second accumulation time register 215 is a register that stores the immediately preceding accumulation time setting.

When accumulation time setting is changed, a value of the first accumulation time register 214 is shifted to the second accumulation time register 215 and the accumulation time setting stored in the first accumulation time register 214 is updated to new accumulation time setting.

In clamp converging operation, the clamp-value calculation processing unit 213 calculates a new clamp value.

Specifically, the clamp-value calculation processing unit 213 calculates, from data of the VOPB detection result register 212 that stores a detection result of VOPB detection data corresponding to the first accumulation time register 214 and a clamp value at that point, a new clamp value with which the VOPB detection data is reduced to zero.

Readout with a clamp value calculated in the next frame is repeatedly performed.

Therefore, in a state in which a clamp value converges, a clamp value corresponding to the first accumulation time register 214 is obtained.

When accumulation time setting is changed, a value of the first accumulation time register 214 is shifted to the second accumulation time register 215 and the accumulation time setting stored in the first accumulation time register 214 is updated to new accumulation time setting.

At this point, a clamp value is a value corresponding to the second accumulation time register 215.

The clamp-prediction-value calculation processing unit 216 calculates a clamp prediction value from the accumulation times stored in the first accumulation time register 214 and the second accumulation time register 215 and the clamp value of the clamp value register 218.

After the accumulation time setting change, when readout of a first frame is started, the accumulation time change enable signal TCEN is activated and the clamp prediction value S216 calculated via the selector 217 is output as a clamp value.

For the next and subsequent frames, the operation returns to the clamp converging operation explained above. However, since the clamp value is already calculated taking into account the accumulation time after the change, it is possible to eliminate or reduce a period until clamp reconvergence.

<4. Second Configuration Example of Clamp-Value Acquiring Unit>

Figure 8:
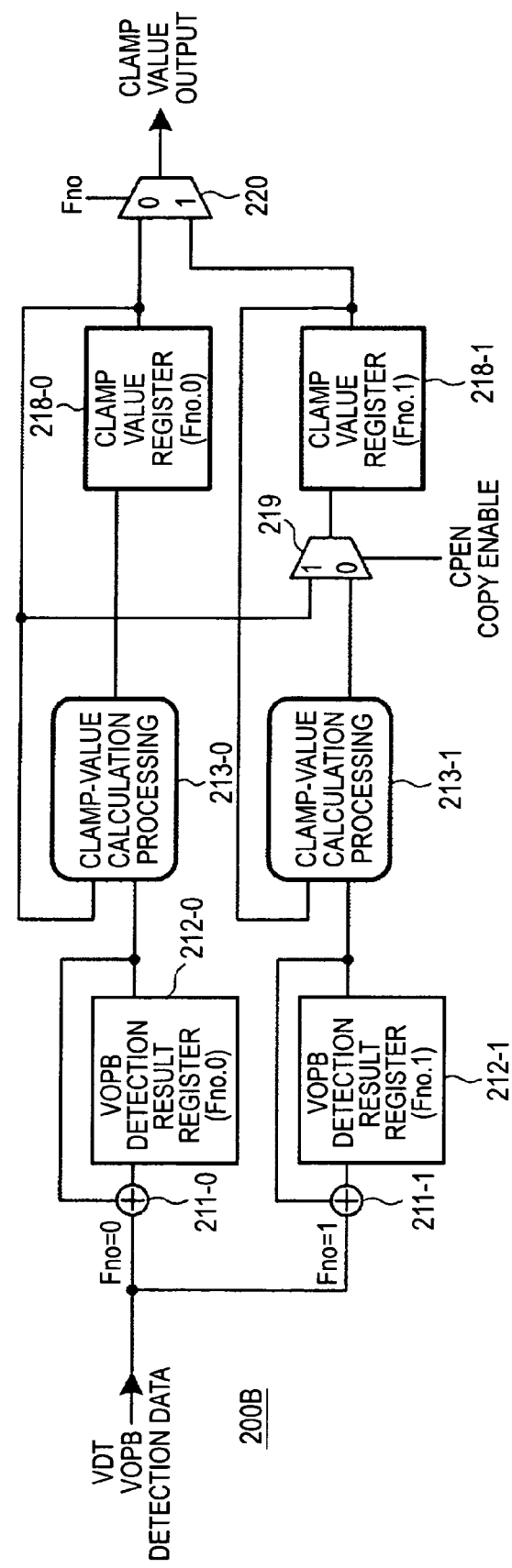
FIG. 8 is a diagram of a second configuration example of the clamp-value acquiring unit according to the embodiment.

FIG. 8 is a diagram of a second configuration example of the clamp-value acquiring unit according to this embodiment.

To facilitate understanding, in FIG. 8, components having functions same as those shown in FIG. 7 are denoted by the same reference numerals and signs.

A clamp-value acquiring unit 200B shown in FIG. 8 has a configuration corresponding to a driving system for combining plural frames having different accumulation times to expand a dynamic range.

Combination of two frames is explained as an example. Two frames having different accumulation times are respectively represented as Fno.0 and Fno.1.

The clamp-value acquiring unit 200B includes adders 211-0 and 211-1, VOPB detection result registers 212-0 and 212-1, clamp-value calculation processing units 213-0 and 213-1, clamp value registers 218-0 and 218-1, and selectors 219 and 220.

The selector 219 inputs, according to a copy enable signal CPEN, a clamp value calculated by the clamp-value calculation processing unit 213-1 or a clamp value of the clamp value register 218-0 to the clamp value register 218-1.

When the copy enable signal CPEN is inactive, for example, "0 (a low level)", the selector 219 selects the clamp value calculated by the clamp-value calculation processing unit 213-1 and inputs the clamp value to the clamp value register 218-1.

When the copy enable signal CPEN is active, for example, "1 (a high level)", the selector 219 selects the clamp value of the clamp value register 218-0 and inputs the clamp value to the clamp value register 218-1.

The copy enable signal CPEN is activated when a mode of the solid-state imaging device 100 is transitioned to a plural frame (Fno.0, Fno.1) driving mode.

The selector 220 outputs the clamp value of the clamp value register 218-0 or 218-1 according to a frame number.

In the clamp-value acquiring unit 200B shown in FIG. 8, in a clamp converging state in a single frame (Fno.0) driving, the clamp value register (Fno.0) 218-0 has a converged value.

When the mode is transitioned to the plural frame (Fno.0, Fno.1) driving mode, the copy enable signal CPEN is activated and a value of the clamp value register (Fno.0) 218-0 is copied to the clamp value register (Fno.1) 218-1 via the selector 219.

When a first frame of Fno.1 is read out, the copied value is output as a clamp value.

Consequently, first VOPB detection data is read out with a clamp value in a converging state at that point. Therefore, it is possible to reduce a period until clamp convergence.

The clamp value calculation processing is separately described for Fno.0 and Fno.1. This is for clearly indicating which of processing for Fno.0 and processing for Fno.1 the clamp value calculation processing is. Actually, the clamp value calculation processing can be realized by resource sharing for performing processing in different periods.

<5. Third Configuration Example of Clamp-Value Acquiring Unit>

Figure 9:
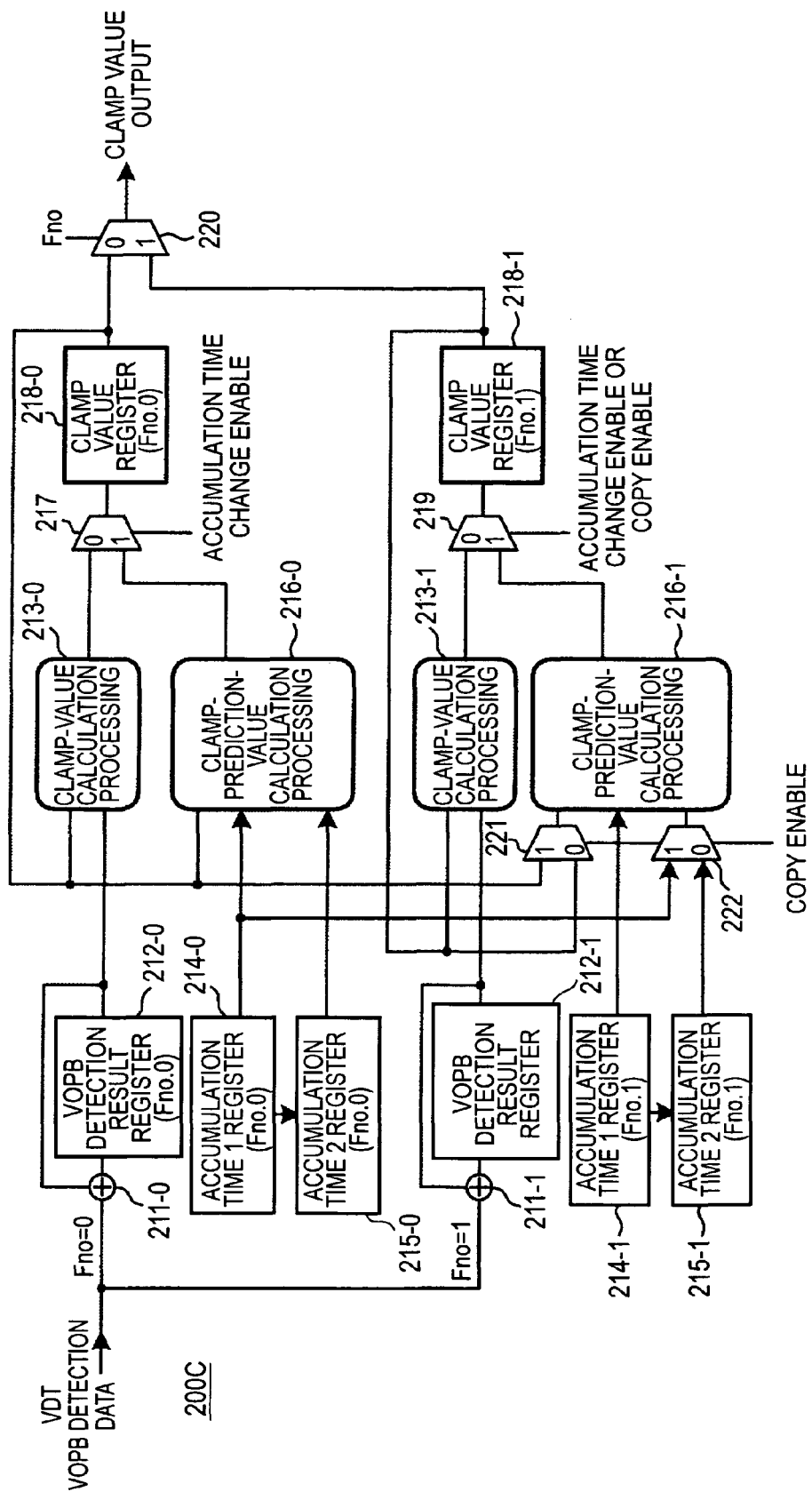
FIG. 9 is a diagram of a third configuration example of the clamp-value acquiring unit according to the embodiment.

FIG. 9 is a diagram of a third configuration example of the clamp-value acquiring unit according to this embodiment.

A clamp-value acquiring unit 200C shown in FIG. 9 is configured by combining the first configuration shown in FIG. 7 and the second configuration shown in FIG. 8.

In the second configuration example, a clamp value of Fno.0 is simply copied. However, in the third configuration example, in copying, clamp prediction value calculation processing in the first configuration example is performed.

The selector 219 performs selection processing according to the accumulation time change enable signal TCEN or the copy enable signal CPEN.

Specifically, the selector 219 selectively inputs a clamp value calculated by the clamp-value calculation processing unit 213-1 or a clamp prediction value calculated by the clamp-prediction-value calculation processing unit 216-1 to the clamp value register 218-1.

A selector 221 inputs, according to the copy enable signal CPEN, a clamp value of the clamp value register 218-0 or a clamp value of the clamp value register 218-1 to the clamp-prediction-value calculation processing unit 216-1.

A selector 222 inputs, according to the copy enable signal CPEN, first accumulation time of the first accumulation time register 214-0 or accumulation time of the second accumulation time register 215-1 to the clamp-prediction-value calculation processing unit 216-1.

In the clamp prediction value calculation processing during copying, the clamp-prediction-value calculation processing unit 216-1 calculates a clamp prediction value from the accumulation times of the first accumulation time register (Fno.0) 214-0 and the first accumulation time register (Fno.1) 214-1 and the clamp value of the clamp value register (Fno.0) 218-0.

Consequently, a clamp value is calculated taking into account accumulation time, which is not taken into account in the second configuration example. Therefore, clamp convergence of the frame Fno.1 started anew is unnecessary or a period until the clamp convergence can be reduced.

The clamp prediction value calculation processing is separately described for Fno.0 and Fno.1. This is for clearly indicating which of processing for Fno.0 and processing for Fno.1 the clamp prediction value calculation processing is. Actually, the clamp prediction value calculation processing can be realized by resource sharing for performing processing in different periods.

According to this embodiment, since the solid-state imaging device 100 includes the clamp-value acquiring units 200 to 200C explained above, it is possible to eliminate or reduce a period until clamp reconvergence when a setting change for accumulation time is performed.

It is possible to eliminate or reduce a clamp convergence period of a frame started anew when a mode of the solid-state imaging device 100 is transitioned from the single frame driving to the plural frame driving.

The solid-state imaging device having such effects can be applied as an imaging device for a digital camera and a video camera.

<6. Configuration Example of Camera System>

Figure 10:
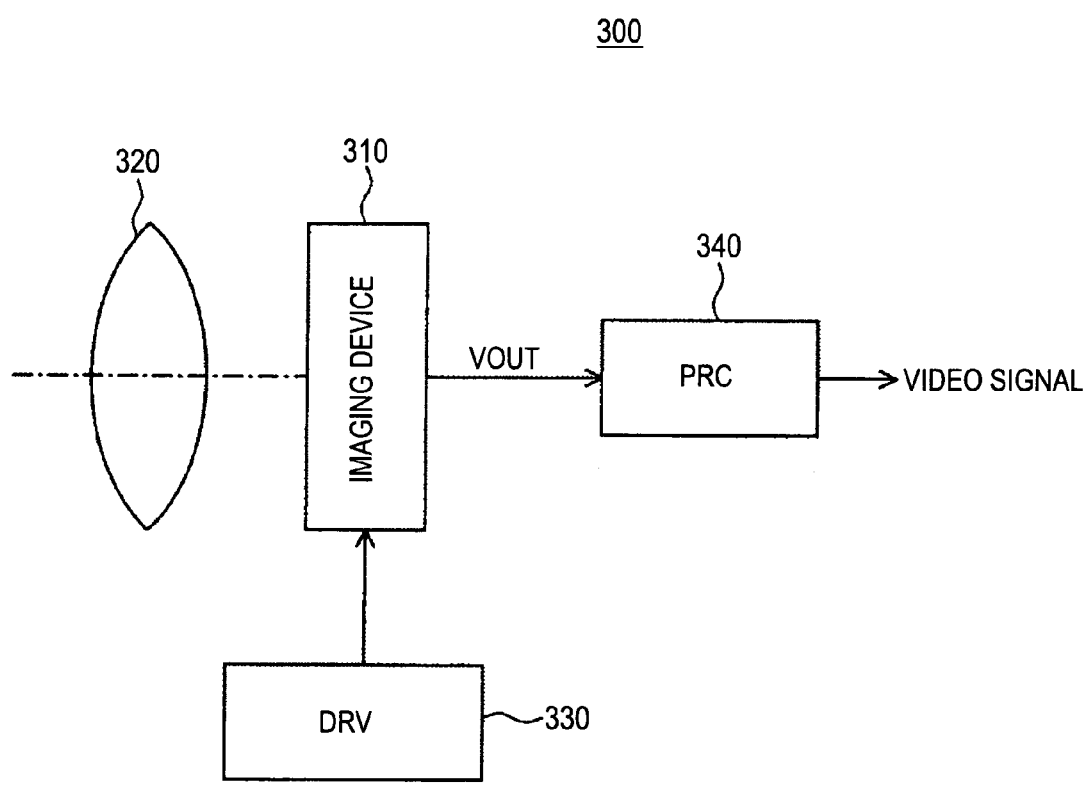
FIG. 10 is a diagram of an example of the configuration of a camera system to which the solid-state imaging device according to the embodiment is applied.

FIG. 10 is a diagram of an example of the configuration of a camera system to which the solid-state imaging device according to this embodiment is applied.

A camera system 300 includes, as shown in FIG. 10, an imaging device 310 to which the CMOS image sensor (the solid-state imaging device) 100 according to this embodiment can be applied.

The camera system 300 includes an optical system that leads incident light to a pixel area of the imaging device 310 (focuses a subject image), for example, a lens 320 that focuses incident light (image light) on an imaging plane.

The camera system 300 further includes a driving circuit (DRV) 330 that drives the imaging device 310 and a signal processing circuit (PRC) 340 that processes an output signal of the imaging device 310.

The driving circuit 330 includes a timing generator (not shown) that generates various timing signals including a start pulse and a clock pulse for driving circuits in the imaging device 310. The driving circuit 330 drives the imaging device 310 with predetermined timing signals.

The signal processing circuit 340 applies predetermined signal processing to an output signal of the imaging device 310.

An image signal processed by the signal processing circuit 340 is recorded in a recording medium such as a memory. Image information recorded in the recording medium is hard copied by a printer or the like. The image signal processed by the signal processing circuit 340 is shown as a moving image on a monitor including a liquid crystal display.

As explained above, it is possible to realize a high-precision camera with low power consumption by mounting the solid-state imaging device 100 as the imaging device 310 in an imaging apparatus such as a digital still camera.

The present application contains subject matter related to that disclosed in Japanese Priority Patent Application JP 2009-177866 filed in the Japan Patent Office on Jul. 30, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   optical black pixels of a pixel unit, said optical black pixels being configure to output black region readout signals;
   a readout processing unit configured to convert said black region readout signals into optical black region readout data;
   a clamp processing unit, said clamp processing unit includes an adder and a detection result register,
   wherein said adder is configured to add said optical black region readout data to detection result data, said detection result register being configured to store integrated detection data and to output said detection result data,
   wherein said integrated detection data within said detection result register is said detection result data, said detection result data added to said optical black region readout data becoming said integrated detection data,
   wherein said clamp processing unit includes:
      a clamp value register configured to store clamp value data and to output control signal data, said control signal data and said detection result data being used to calculate said clamp value data,
      a clamp digital-analog converter configured to generate a clamp, said control signal data being used to regulate a signal level of clamp signal,
      a ramp digital-analog converter configured to generate a ramp signal, said ramp signal being added to said clamp signal.

2. A solid-state imaging device according to claim 1, wherein said clamp value data within said clamp value register is said control signal data.

3. A solid-state imaging device according to claim 1, wherein said control signal data is used to convert valid region readout signals into valid region readout data, said valid region readout signals being output from valid pixels of the pixel unit.

4. A solid-state imaging device according to claim 3, wherein said valid pixels are arranged in a valid pixel region of a pixel matrix.

5. A solid-state imaging device according to claim 4, wherein said optical black pixels are arranged in an optical black region of the pixel matrix.

6. A solid-state imaging device according to claim 1, wherein said pixel unit is configured to convert incident light into charges, an amount of said charges corresponding to an amount of the incident light.

7. A camera system comprising:
   the solid-state imaging device according to claim 1;
   an optical system configured to focus a subject image onto said solid-state imaging device.

* * * * *